(12) United States Patent
Sheridan, Jr.

(10) Patent No.: US 7,591,220 B2
(45) Date of Patent: Sep. 22, 2009

(54) PORTABLE ROLLER GRILL

(76) Inventor: James T. Sheridan, Jr., 43 Buckman Dr., Wrightstown, PA (US) 18940

( * ) Notice: Subject to any disclaimer, the term of this patent is extended or adjusted under 35 U.S.C. 154(b) by 335 days.

(21) Appl. No.: 11/451,980

(22) Filed: Jun. 13, 2006

(65) Prior Publication Data

US 2007/0283822 A1 Dec. 13, 2007

(51) Int. Cl.
 A47J 37/04 (2006.01)
 A47J 43/08 (2006.01)
(52) U.S. Cl. ............... 99/441; 99/443 R; 99/449; 126/25 A; 126/30; 126/181
(58) Field of Classification Search ............... None
 See application file for complete search history.

(56) References Cited

U.S. PATENT DOCUMENTS

| | | | | |
|---|---|---|---|---|
| 1,078,769 A | * | 11/1913 | Camp | 126/181 |
| 2,020,503 A | * | 11/1935 | Hanson et al. | 248/188.5 |
| 2,502,818 A | * | 4/1950 | Bocchino | 99/393 |
| 2,604,842 A | * | 7/1952 | Dolce | 99/423 |
| 3,144,016 A | * | 8/1964 | Basci | 126/265 |
| 3,331,308 A | | 7/1967 | Hoffert | |
| 3,854,392 A | * | 12/1974 | Eason | 99/421 H |
| 4,370,920 A | | 2/1983 | Henriques et al. | |
| 4,982,657 A | | 1/1991 | Ghenic | |
| 5,058,493 A | * | 10/1991 | Basek et al. | 99/339 |
| 5,117,748 A | * | 6/1992 | Costa | 99/441 |
| 5,906,196 A | * | 5/1999 | Measom | 126/304 A |
| 7,080,640 B2 | * | 7/2006 | Sanders et al. | 126/30 |
| 7,166,820 B1 | * | 1/2007 | Chen | 219/386 |
| 2006/0102163 A1 | * | 5/2006 | Sanders et al. | 126/30 |
| 2006/0272630 A1 | * | 12/2006 | Sanders et al. | 126/9 R |
| 2007/0012201 A1 | * | 1/2007 | Ho | 99/441 |

* cited by examiner

Primary Examiner—Joseph M Pelham
(74) Attorney, Agent, or Firm—Drinker Biddle & Reath LLP (57) ABSTRACT

A portable roller grill for cooking hot dogs includes an array of rollers coupled between a drive-end bracket and an idler-end bracket of a frame and a drive system. The drive system includes drive gears and intermediate gears arranged between the drive gears such that all of the drive gears rotate in the same rotational direction. The drive gears are coupled to the rollers such that rotation of the drive gears result in rotation of the rollers. Each drive gear is adapted to receive a motorized drive member such that the drive system can be actuated using any of the drive gears. The roller grill includes legs coupled to the brackets to support the rollers at an adjustable height above a heat source in a deployed leg condition. The legs have a collapsed condition facilitating storage and transportation.

15 Claims, 5 Drawing Sheets

PORTABLE ROLLER GRILL

FIELD OF THE INVENTION

The present invention relates generally to cooking devices and, more particularly to a roller grill for cooking hot dogs, sausages and the like.

BACKGROUND OF THE INVENTION

Roller grills for cooking hot dogs, sausages, and the like (hereinafter, "hot dogs") include an array of elongated rollers arranged in a side-by-side fashion for supporting hot dogs between adjacent pairs of the rollers. All of the rollers rotate in the same rotational direction to provide for sustained counter-rotation of hot dogs supported on the rollers.

Commercial roller grills incorporate a motorized drive system for rotating the rollers and a heat source for cooking the hot dogs supported on the rollers. It is also known, as disclosed in U.S. Pat. No. 3,331,308 to provide a rotisserie having rotating rollers for supporting sausages above a pan of the rotisserie. The rotisserie includes a source of heat, preferably an electric heating coil, located in the pan beneath the rollers for cooking sausages supported on the rollers. The rotisserie includes a drive system including a motor and a gear train for rotating the rollers.

What is needed is a roller grill that is portable, economical, and adjustable to facilitate use of the roller grill with a variety of heat sources.

SUMMARY OF THE INVENTION

According to one aspect, the present invention provides a roller grill for cooking hot dogs comprising a plurality of elongated rollers, a frame including a drive-end support member and an idler-end support member, and a drive system supported by the drive-end support member of the frame. Each of the rollers includes a drive end and an opposite idler end and is rotatably supported between the drive-end support member and the idler-end support member of the frame.

The drive system of the roller grill includes drive gears and intermediate gears arranged for rotation about central axes of the gears. Each of the drive gears is coupled to the drive end of one of the rollers such that rotation of the drive gear results in rotation of the roller. Each of the intermediate gears is disposed between two of the drive gears and includes gear teeth meshingly engaging gear teeth of the drive gears. The drive gears and the intermediate gears are arranged such that all of the drive gears rotate in the same rotational direction during actuation of the drive system.

Each of the drive gears is adapted to receive a motorized drive member for rotatingly driving the drive gear such that the drive system can be actuated using any of the drive gears. According to one embodiment, the motorized drive member is a chuck of a rotisserie motor and each of the drive members defines a socket opening adapted for receiving the chuck.

According to one embodiment, each of the rollers includes a roller tube, a drive-end fitting, and an idler-end fitting. The drive-end fitting and the idler-end fitting of the roller are received by the roller tube at opposite ends of the roller tube. The drive-end fitting defines a socket opening adapted for receiving a shaft of one of the drive gears of the drive system.

According to another embodiment, the frame includes a plurality of legs coupled to the support members of the frame to support the rollers at a height above a heat source. The legs are adjustably coupled to the support members by fastening assemblies to provide for variation in the roller support height. Each fastening assembly includes a first member having an externally threaded shaft received by an elongated slot in the leg and a second member having an internally threaded portion engaging the shaft of the first member for releasably securing the leg to the associated support member at a desired location on the leg.

According to another aspect, the invention provides a portable grill comprising a roller array, first and second support brackets disposed at opposite ends of the roller array; a pair of connectors each including an elongated rod coupled between the first and second brackets and extending along opposite sides of the roller array; a drive system; and a plurality of legs coupled to the brackets. The roller array includes a plurality of elongated roller tubes arranged in side-by-side fashion to support hot dogs between adjacent pairs of the roller tubes. The roller array is coupled between the brackets for rotation of the roller tubes about central axes of the roller tubes.

The drive system of the portable grill includes drive gears coupled to drive ends of the roller tubes such that rotation of the drive gears rotates the roller tubes. Intermediate gears are disposed between the drive gears such that all of the drive gears rotate in the same rotational direction during actuation of the drive system.

The legs are adapted for coupling to the brackets in a deployed condition to support the roller array at a height above a heat source. The legs are adjustably coupled to the brackets to provide for variation in the roller support height. The coupling between the brackets and legs is adapted to provide a collapsed condition of the legs facilitating storage and transportation of the portable grill. According to one embodiment, the legs in the collapsed leg condition are substantially perpendicular to the legs in the deployed leg condition. According to another embodiment, each of the drive gears is adapted for coupling to a drive motor such that the drive system of the portable grill can be actuated using any of the drive gears.

According to another aspect, the invention provides a roller grill having an array of rollers including a plurality of elongated roller tubes supported for rotation about central axes of the roller tubes and a drive system including a gear assembly adapted for actuation by a drive motor. The roller tubes are arranged in side-by-side fashion for supporting hot dogs between adjacent pairs of the roller tubes. The gear assembly includes a plurality of drive gears and a plurality of intermediate gears rotatably supported for rotation about central axes of the gears. Each intermediate gear is disposed between a pair of drive gears and arranged such that all of the drive gears rotate in the same rotational direction.

Each of the drive gears of the drive system gear assembly of the roller grill is adapted for engagement by the drive motor such that the drive system can be actuated using any of the drive gears.

BRIEF DESCRIPTION OF THE DRAWINGS

For the purpose of illustrating the invention, the drawings show a form of the invention that is presently preferred. However, it should be understood that this invention is not limited to the precise arrangements and instrumentalities shown in the drawings.

DESCRIPTION OF THE INVENTION

Figure 1:
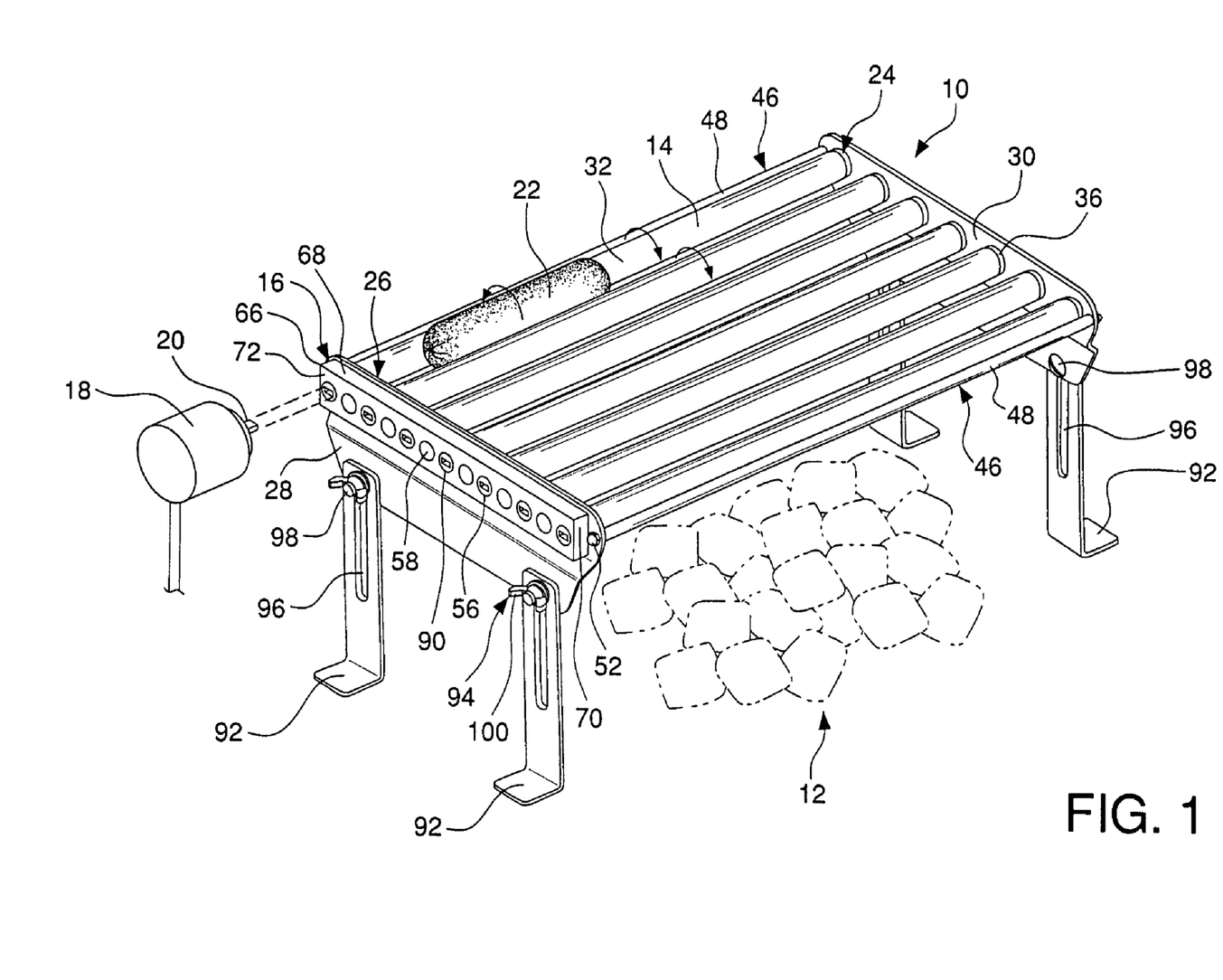
FIG. 1 is a perspective view of a roller grill according to an exemplary embodiment of the invention.

Referring to the drawings, where like numerals identify like elements, there is illustrated in FIG. 1 a roller grill 10 according to an exemplary embodiment of the invention for cooking hot dogs, sausages and the like. As described below in greater detail, the roller grill 10 of the present invention provides an apparatus that is portable, economical, and adjustable. The roller grill 10 is adapted for use with a separate heat source 12. The heat source 12 is shown in broken line in FIG. 1 to indicate that the roller grill 10 is not limited in application to use with any particular heat source. The roller grill 10 is versatile and is adapted for use with various heat sources. The roller grill 10 could, for example, be supported by another cooking device such as on a rack of an outdoor barbeque grill adapted for connection to a propane tank or used with charcoal briquettes or on a cooking device incorporating an electric heating element.

The roller grill 10 includes an array of elongated rollers 14 rotatably supported at opposite ends of the rollers 14. The rollers 14 are rotatingly driven by a drive system 16 of the roller grill 10 that, as described below, is actuated by a rotating drive member such as a chuck 20 of an electrical rotisserie motor 18 depicted schematically in FIG. 1. The rollers 14 are arranged in side-by-side fashion and spaced apart from each other for rotatably supporting hot dogs 22, as depicted in FIG. 1, between adjacent pairs of the rollers 14. Each of the rollers 14 includes a drive end 24 and an opposite idler end 26. The rollers 14 are supported by a frame of the roller grill 10 including first and second brackets 28, 30 respectively supporting the drive ends 24 and the idler ends 26 of the rollers 14.

Figure 2:
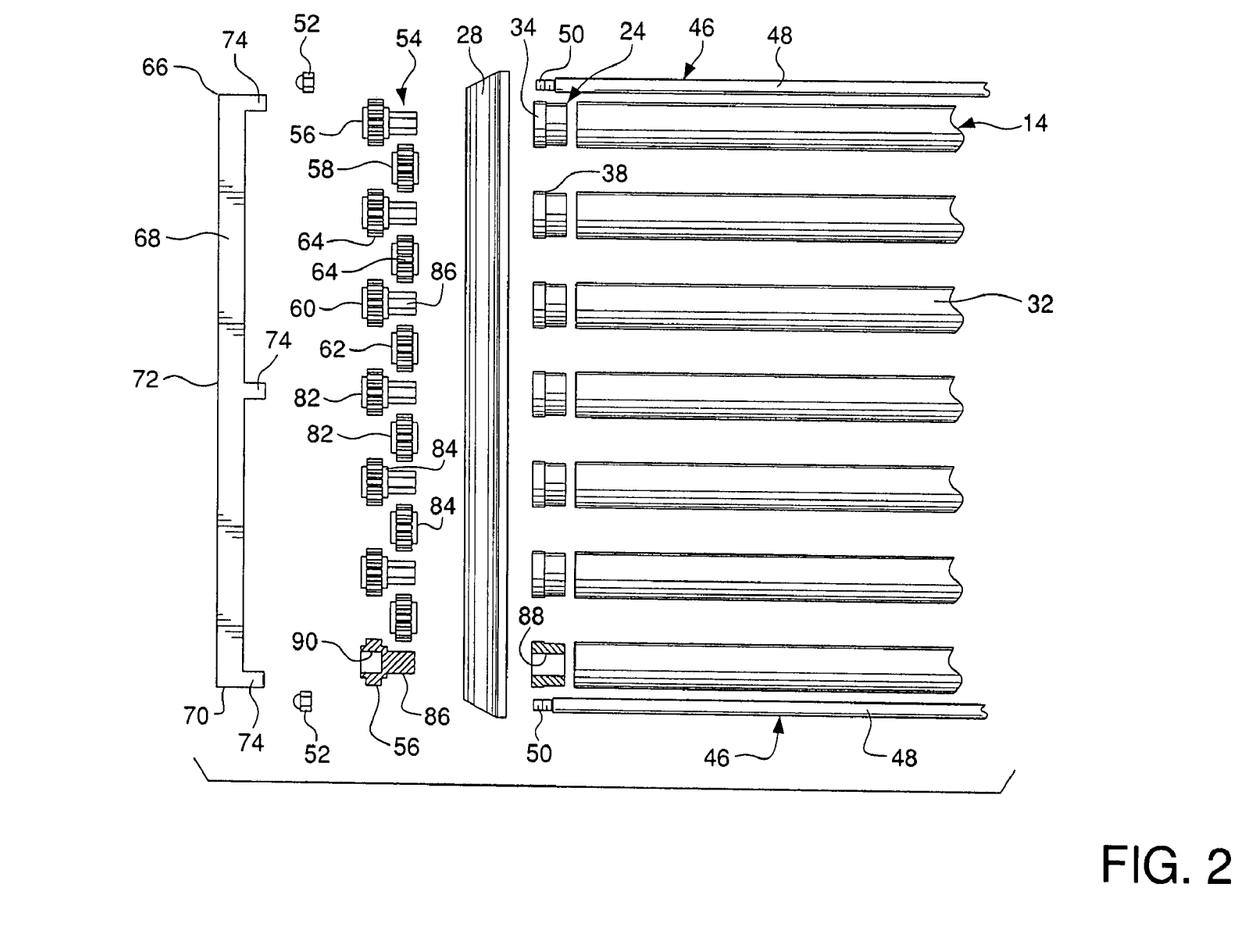
FIG. 2 is an exploded top view of a drive end of the roller grill of FIG. 1 shown without the legs and leg fastening assemblies of the roller grill for clarity.
Figure 3:
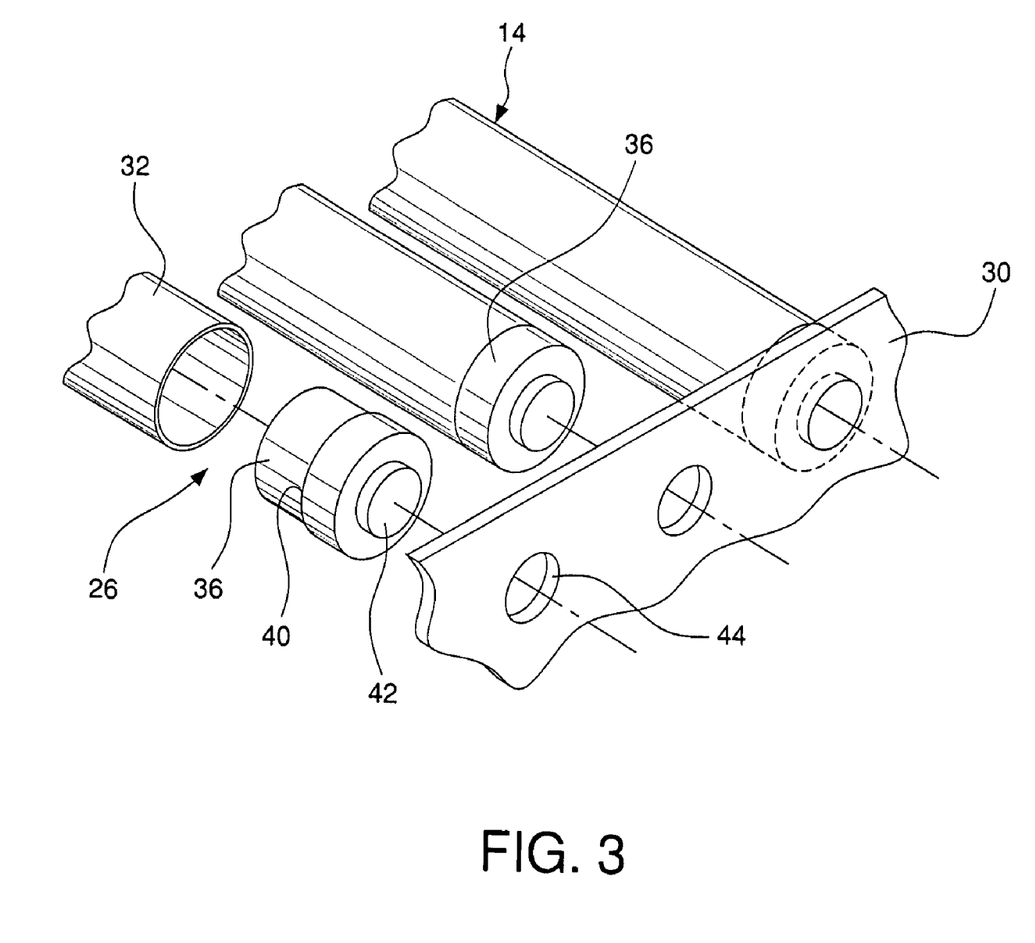
FIG. 3 is an exploded perspective view of the idler end of the roller grill of FIG. 1.

Referring to FIGS. 2 and 3, the rollers 14 of the roller grill 10 are shown in greater detail. Each of the rollers 14 includes an elongated tube 32. Each of the rollers 14 also includes a drive-end fitting 34 and an idler-end fitting 36 received by the roller tube 32 of the roller 14 at opposite ends of the roller tube 32. Referring to FIG. 2, the drive-end fittings 34 are adapted for sliding receipt by the roller tubes 32. Each of the drive-end fittings 34 includes a recessed outer surface defining an annular shoulder 38 for contact with an end of the roller tube 32. Referring to FIG. 3, the idler-end fittings 36 are also adapted for sliding receipt by the roller tube 32 at an end of the roller tubes 32 opposite the drive-end fittings 34. Similar to the drive-end fittings 34, each of the idler-end fittings 36 includes a recessed outer surface defining an annular shoulder 40 for contacting a terminal end of the roller tube 32. In the depicted embodiment, the annular shoulders 38, 40 of the end fittings 34, 36 have outer diameters dimensioned to provide a substantially flush interfit between the end fittings 34, 36 and the roller tube 32.

The drive-end support bracket 28 and the idler-end support bracket 30 are disposed at opposite ends of the rollers 14 for rotatably supporting the rollers 14. Referring to FIG. 3, each of the idler-end fittings 36 of the rollers 14 includes an end projection 42 adapted for receipt by an opening 44 defined by the idler-end support bracket 30. As described below in greater detail, the drive system 16 of the roller grill 10 is supported by the drive-end support bracket 28 and is coupled to the drive ends 24 of the rollers 14 to rotatably support the drive ends 24. The roller grill 10 includes a pair of connector assemblies 46 for securing the brackets 28, 30 to each other with the rollers 14 disposed between the brackets 28, 30. Each of the connector assemblies 46 includes an elongated rod 48 having threaded portions 50 at each of opposite ends of the rod 48. The rod 48 is received at its ends in openings provided in the brackets 28, 30. Each connector assembly 46 also includes a pair of internally threaded nut caps 52 threadedly engaging the threaded portions 50 of the rod 48 to secure the rod 48 to the brackets 28, 30.

Referring to FIG. 2, the drive system 16 includes a gear assembly 54 having a plurality of drive gears 56 and a plurality of intermediate gears 58. The drive gears 56 and the intermediate gears 58 respectively include gear bodies 60, 62 each having gear teeth 64 disposed about the gear body 60, 62. The body 62 of each intermediate gear 58 is located between the bodies 60 of a pair of the drive gears 56 such that the teeth 64 of the intermediate gear 58 meshingly engages the teeth 64 of each of the drive gears 56. Arranged in this manner, each of the gears 56, 58 of the drive system 16 will rotate about a central axis of the gear 56, 58 when the drive system 16 is actuated. As should be understood by one skilled in the art, the drive gears 56 will all rotate in the same rotational direction, which is opposite to a rotational direction for the intermediate gears 58.

The drive system 16 also includes a gear cover 66 having side walls 68, 70 and an end wall 72 defining an interior and tabs 74 located along an edge of each of the side walls 68 for securing the gear cover 66 to the drive-end bracket 28. The gear cover 66 is secured to the drive-end bracket 28 to rotatably house the gears 56, 58 of the gear assembly 54 within the interior of the gear cover 66. The tabs 74 of the gear cover 66 are illustrated in the exploded view of FIG. 2 in an undeformed condition in which the tabs 74 extend substantially parallel to the side walls 68 of the gear cover 66. The undeformed condition for tabs 74 is the pre-assembly condition for the tabs 74. Referring to the end view of FIG. 4, a portion of the drive system 16 is removed from the view to show an underlying portion of the drive-end bracket 28. As shown, the drive-end bracket 28 includes slot openings 76 each adapted to receive one of the tabs 74 of gear cover 66. As should be understood by one skilled in the art, the tabs 74 are adapted for receipt by the slot openings 76 of the drive-end bracket 28, and to be deformed at an end of the tabs 74 following their receipt in the slot openings 76 to secure the gear cover 66 to the bracket 28.

Figure 4:
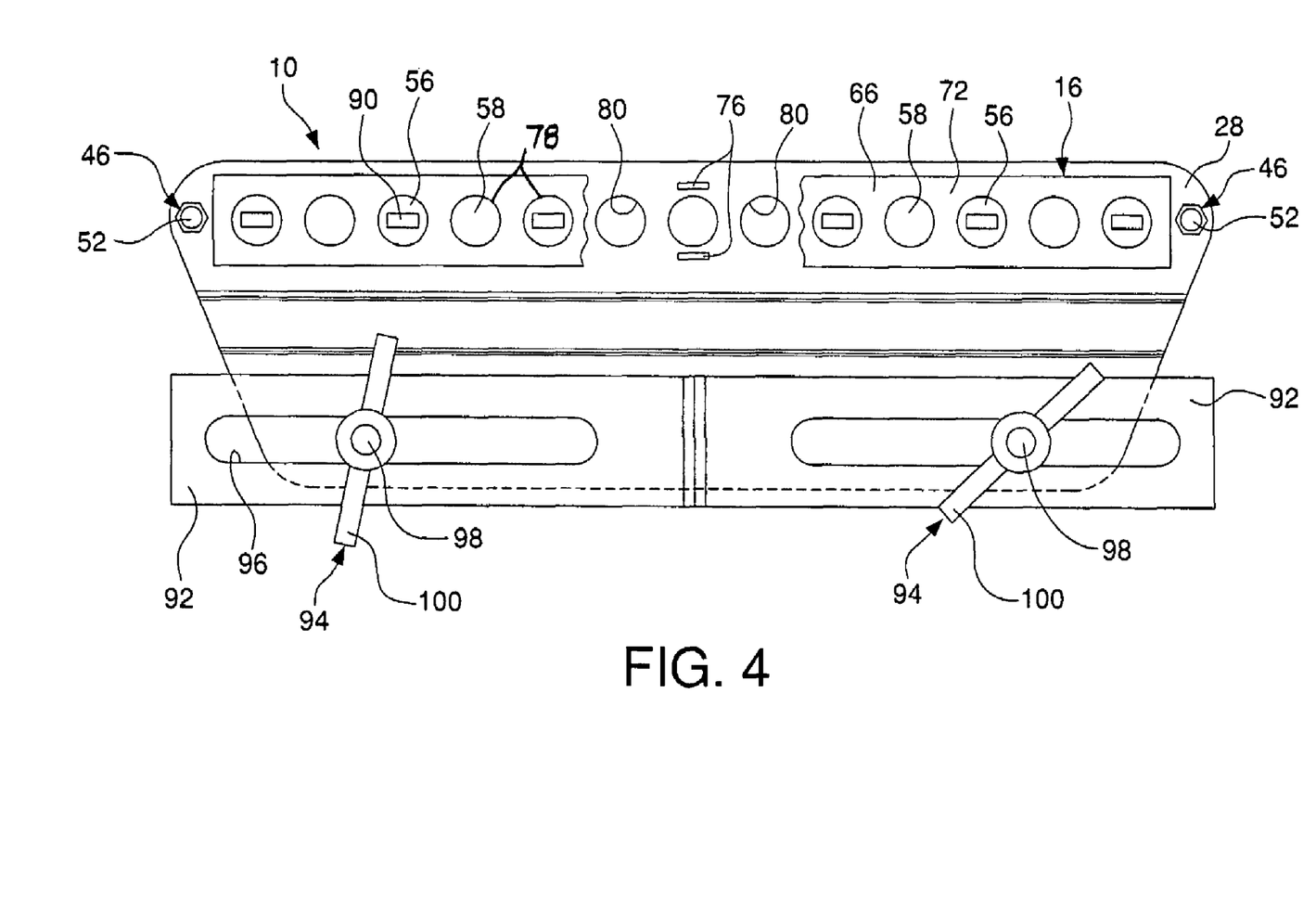
FIG. 4 is a side view of the drive end of the roller grill of FIG. 1, with the legs of the roller grill shown in a collapsed condition for storage.

As shown in FIG. 4, the end wall 72 of the gear cover 66 includes a plurality of circular openings 78. As also shown in FIG. 4, the drive-end bracket 28 also includes a plurality of circular openings 80 substantially underlying the openings 78 of the gear cover 66. Referring to FIG. 2, the teeth 64 on each of the gears 56, 58 have a length that is less than a length of the gear body 60, 62 such that each of the gear bodies 60, 62 includes opposite end portions 82, 84 that do not have teeth disposed about their periphery. The gear bodies 60, 62 have an outer diameter adapted to provide sliding receipt of the end portions 82 of the gear bodies 60, 62 within the circular openings 78 in the gear cover 66. The underlying circular openings 80 in the drive-end bracket 28 have a diameter that is substantially equal to that of the gear cover openings 78. The openings 80 in the drive-end support bracket 28 are adapted for sliding receipt of the gear body end portions 84 of the gears 56, 58. In this manner, the bodies 60, 62 of the gears 56, 58 are rotatably mounted within the interior of the gear cover 66 between the gear cover 66 and the drive-end bracket 28 for rotation of each gear 56, 58 about its central axis.

Referring to FIG. 2, each of the drive gears 56 includes a shaft 86 extending from the end portion 84 of the body 60 of the drive gear 56. As depicted by the drive-end fitting 34 illustrated in section in FIG. 2, the drive-end fitting 34 for each of the rollers 14 includes a socket opening 88. The socket opening 88 of the drive-end fitting 34 is adapted to slidingly receive the shaft 86 of the associated drive gear 56 such that the drive ends 24 of the rollers 14 are supported by the shaft 86. The shaft 86 and the drive-end socket opening 88 are adapted to transfer torque therebetween such that rotation of each drive gear 56 results in a corresponding rotation of the associated roller 14. The depicted drive gear shaft 86 includes faceted surfaces (e.g., a hexagon cross-section) to provide the desired torque transfer with the socket opening 88 of the drive-end fitting 34.

As shown in FIG. 2 by the drive gear 56 illustrated in section, the body 60 of each of the drive gears 56 includes a socket opening 90 in gear body 60 opposite the shaft 86 for engagement by drive motor 18. The socket opening 90 is also depicted in FIG. 2 by the drive gear 56 illustrated in section. As shown in FIGS. 1 and 4, the socket opening 90 of the drive gears 56 is rectangular in configuration for receiving the cooperatively formed chuck 20 of the drive motor 18 for transfer of torque therebetween. Rotation of the chuck 20 by motor 18 results in rotation of the drive gear 56, thereby actuating the gear assembly 54 of the drive system 16. As described above, the direction in which the drive gears 56 rotate during actuation of the gear assembly 54 is the same for all of the drive gears 56. As a result, all of the rollers 14 of the roller grill 10 rotate in the same direction (clockwise in FIG. 1 as shown by the rotational arrows). The rotation of the rollers 14 in this manner functions to rotate a hot dog supported between an adjacent pair of the rollers 14 in the opposite rotational direction (counter-clockwise in FIG. 1).

As described above, the body 60 of each of the drive gears 56 includes a socket opening 90. Thus, the chuck 20 of the drive motor 18 could be received by any one of the drive gears 56. This arrangement, in which each of the drive gears 56 can be used to actuate the drive system 16, desirably provides versatility in the location of the roller grill 10 with respect to the drive motor 18. For example, in applications where the roller grill 10 is supported on a rack of an outdoor barbeque grill defining a cooking area larger than that defined by the roller grill 10, the roller grill 10 could be located at numerous locations on the rack for engagement by the drive motor 18. This is desirable, for example, in applications in which a drive motor (e.g., a rotisserie motor) is mounted to the cooking device in a fixed location.

Figure 5A:
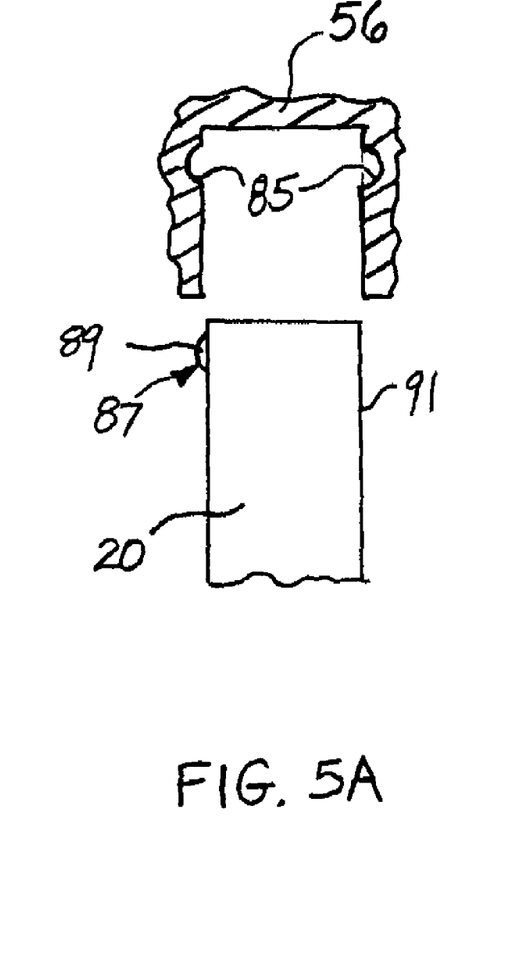
FIGS. 5A through 5C illustrate portions of a drive chuck end and a drive gear of the roller grill of FIG. 1 showing engagement between a detent mechanism of the drive check and a recess defined by the drive gear within a socket opening of the drive gear.
Figure 5B:
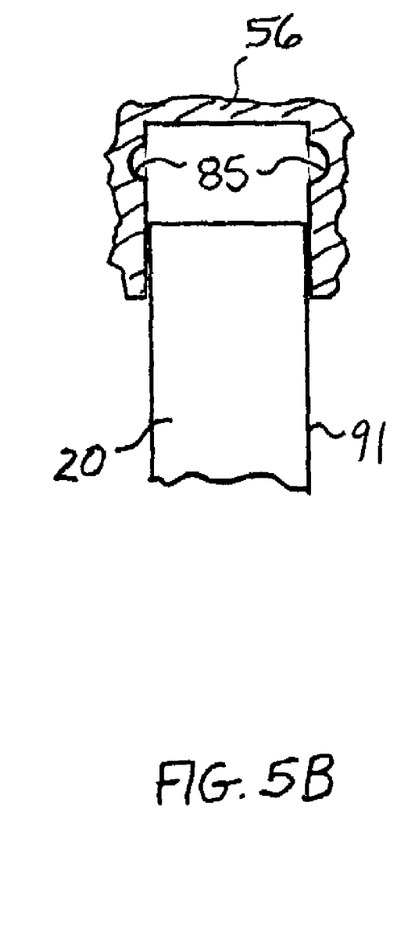
Figure 5C:
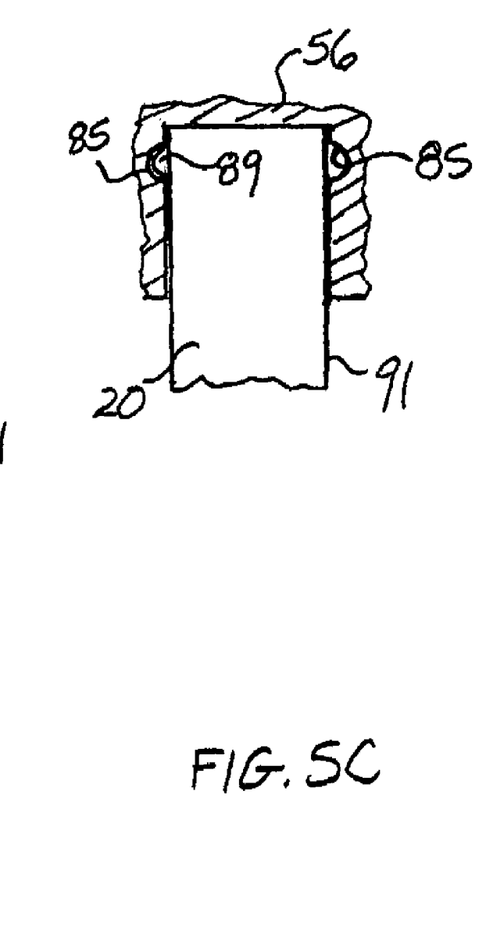

Referring to FIGS. 5A through 5C, there is shown an end portion of the drive motor chuck 20 and a portion of one of the drive gears 56 adjacent its socket opening 90, illustrated in section. As shown, the drive gear 56 defines recesses 85 on opposite sides of the socket opening 90. The end portion of the drive motor chuck 20 includes a detent mechanism 87 engageable with one of the recesses 85 defined by the drive gear 56 within the socket opening 90. The engagement between the detent mechanism 87 and the recesses 85 desirably limits unintended withdrawal of the drive motor chuck 20 from the socket opening 90 resulting from rotation of the chuck 20 and the drive gear 56 during actuation of the drive system 16.

In the depicted drive motor chuck 20, the detent mechanism 87 includes a ball 89. The ball 89 is urged by a spring (not seen) located within the chuck 20 towards a position in which the ball 89 projects outwardly from a periphery of a rectangular body 91 of the chuck 20. Referring to FIG. 5A, the drive chuck 20 is shown in a removed condition with respect to the drive gear socket opening 90. As shown, the spring-biased ball 89 extends from the periphery of body 91. Referring to FIG. 5B, the chuck 18 is shown in a partially-engaged position with respect to the drive gear socket opening 90. As shown, the chuck body 91 and the socket opening 90 are dimensioned such that the ball 89 of detent mechanism 87 is contacted by the drive gear 56 and driven inwardly with respect to the chuck 20.

Referring to 5C, the drive chuck has been inserted into the socket opening 90 to a fully-engaged position. As shown, the detent mechanism 87 is aligned in the fully-engaged position with one of the opposite recesses 85 defined within the socket opening 90. The spring-biased ball 89 is directed outwardly from the periphery of chuck body 91 into the recess 85, thereby engaging the detent mechanism 87 to the drive gear 56. The inclusion of recesses 85 on each of opposite sides of the socket opening 90 provides universality between the detent mechanism 87 and the drive gear socket opening 90 such that the detent mechanism 87 will engage the drive gear 56 regardless of the relative angular orientation between the drive gear 56 and chuck 20 when the chuck 20 is received by the socket opening 90.

The roller grill 10 also includes legs 92 and fastening assemblies 94 for coupling the legs 92 to the brackets 28, 30. Each leg 92 includes an elongated slot 96 for adjusting the height at which the rollers 14 of the roller grill 10 are supported above a support surface (e.g., the rack of a barbeque grill) on which the roller grill 10 is received. Each fastening assembly 94 includes a first member 98 having an externally threaded shaft and a second member 100 having internal threads threadedly engaging the first member. The depicted first and second members 98, 100 are respectively bolts and wing nuts. The threaded shaft of the first member 98 of fastening assembly 94 is received in an opening in the associated bracket 28, 30 and by the slot opening 96 of the associated leg 92. The threaded engagement between the first and second members 98, 100 generates a clamping force between the leg 92 and the associated bracket 28, 30 at a desired location along the slot 96 in the leg 92 to secure the leg 92 to the bracket 28, 30.

Referring to FIG. 4, the adjustable coupling between the legs 92 and the brackets 28, 30 provided by the fastening assemblies 94 also provides for a collapsed position of the legs 92 with respect to the brackets 28, 30 facilitating transportation and storage of the roller grill 10. As shown, the legs 92 in the collapsed storage condition are rotated with respect to the brackets 28, 30 from a deployed condition of the legs shown in FIG. 1 such that the orientation of each leg 92 in the collapsed position is substantially perpendicular to the leg in the deployed condition of the leg 92. As also shown, the legs 92 in the collapsed leg condition extend adjacent lower edges of the brackets 28, 30.

The construction of the fastening assemblies 94, having first and second members threadedly engaged to each other also provides for removal of the legs from the brackets 28, 30 of the roller grill 10. It is conceivable, therefore, that the depicted roller grill 10 could be used with the legs 92 removed from the brackets 28, 30 by supporting the brackets 28, 30 directly on a supporting surface, such as on a rack of a outdoor barbeque grill.

The present invention is not limited to any particular materials for the components of the roller grill 10. According to one presently preferred embodiment, however, the tubes 32 of the rollers 14 are made from stainless steel. The brackets 28, 30 and the legs 92 are also made from stainless steel. The gears 56, 58 of the gear assembly 54 are preferably made from die-cast metal. The drive-end fittings 34 and idler-end fittings 36 of the rollers 14 can also be made from die-cast metal.

The drive motor 18 depicted in FIG. 1 includes a cord for attachment of the drive motor to a receptacle to power the drive motor 18. It should be understood, however, that other types of motors could be used including motors powered by batteries, which could be rechargeable.

As described above, the roller grill 10 depicted in FIGS. 1 through 4 includes legs 92 for supporting the array of rollers 14 of the roller grill 10 at a height above a heat source. When used with another cooking device (e.g., an outdoor barbeque grill), the depicted roller grill 10 is adapted to be supported by the legs 92 atop a component of the cooking device (e.g., a rack of the barbeque grill). When cooking is completed, the roller grill 10 is removable from the cooking device on which it has been supported for subsequent use with a different source of heat if desired. It is conceivable, however, that a roller grill assembly including certain features of the above-described roller grill 10 could be incorporated as an integral component of a stand-alone device (e.g., an outdoor barbeque grill). The roller grill assembly incorporated into a cooking device, such as an outdoor barbeque grill, however, would not include legs for supporting the roller array at a height above a support surface on which the legs are received. Instead, the drive-end and idler-end support members (e.g., brackets) that support the roller array and drive system of the roller grill assembly would be secured (e.g., bolted, welded, etc.) to another component of the cooking device such as a rack of a barbeque grill. It should be understood that the securing of the roller grill assembly need not be permanent. The roller grill assembly could, instead, be releasably secured (e.g., bolted) to provide for removal of the roller grill assembly for cleaning, repair, or replacement of the assembly, for example.

The foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A roller grill for cooking hot dogs comprising:
a plurality of elongated rollers each having a drive end and an opposite idler end;
a frame including a drive-end support member and an idler-end support member, the rollers rotatably supported between the drive-end support member and the idler-end support member;
a drive system supported by the drive-end support member, the drive system including a plurality of drive gears arranged for rotation about central axes of the drive gears, each drive gear coupled to the drive end of one of the rollers such that rotation of the drive gear results in rotation of the roller,
the drive system including a plurality of intermediate gears arranged for rotation about central axes of the intermediate gears, each of the intermediate gears being disposed between two of the drive gears and having gear teeth meshingly engaging gear teeth of the drive gears, the drive gears and intermediate gears arranged such that all of the drive gears rotate in the same rotational direction during actuation of the drive system,
each of the drive gears adapted to receive a motorized drive member for rotatingly driving the drive gear such that the drive system can be actuated using any of the drive gears.

2. The roller grill according to claim 1, wherein the motorized drive member is a chuck of a drive motor and wherein each of the drive gears defines a socket opening adapted for receiving the chuck.

3. The roller grill according to claim 2, wherein the socket opening is rectangular.

4. The roller grill according to claim 2, wherein the drive motor chuck includes a detent mechanism and wherein each of the drive gears defines at least one recess within the socket opening adapted for receiving a portion of the detent mechanism to limit unintended withdrawal of the drive motor chuck with respect to the drive gear during actuation of the drive system.

5. The roller grill according to claim 1, wherein each of the rollers includes a roller tube, a drive-end fitting, and an idler-end fitting, the drive-end fitting and idler-end fitting received by the roller tube at opposite ends of the roller tube.

6. The roller grill according to claim 5, wherein the idler-end support member of the frame defines a plurality of openings each rotatably receiving the idler-end fitting of one of the rollers.

7. The roller grill according to claim 5, wherein each of the drive gears includes an elongated shaft and wherein each of the drive-end fittings of the rollers defines a socket opening adapted for receiving the shaft of the associated drive gear to transfer torque between the drive gear and the roller.

8. The roller grill according to claim 7, wherein the drive-end support member of the frame defines a plurality of openings and wherein the shaft of each drive gear is received by one of the openings of the drive-end support member.

9. The roller grill according to claim 7, wherein each of the intermediate gears is received by one of the openings of the drive-end support member.

10. The roller grill according to claim 1, wherein the drive system includes a gear cover coupled to the drive-end support member of the frame and defining an interior in which at least a portion of each of the drive gears and intermediate gears of the drive system is disposed.

11. The roller grill according to claim 10, wherein the gear cover defines a plurality of openings and wherein a portion of each of the drive gears and intermediate gears of the drive system is rotatably received by one of the openings of the gear cover.

12. The roller grill according to claim 1, wherein the frame includes at least one connector coupled between the drive-end support member of the frame and the idler-end support member of the frame.

13. The roller grill according to claim 1, wherein the drive-end support member of the frame and the idler-end support member of the frame each includes a bracket, and wherein the frame includes a pair of legs coupled to the bracket of each of the drive-end support member and the idler-end support member to support the rollers at a height above a heat source, each of the legs being adjustably coupled to the bracket to provide for variation in the roller support height.

14. The roller grill according to claim 13, wherein each of the legs of the frame includes an elongated slot and wherein the frame includes a fastening assembly for each leg of the frame, the fastening assembly including a first member having an externally threaded shaft received by the slot of one of the legs, each fastening assembly including a second member including an internally threaded portion threadedly engaging the shaft of the first member of the fastening assembly for releasably securing the leg to the associated bracket at a desired location on the leg.

15. A roller grill comprising:

an array of rollers including a plurality of elongated roller tubes each rotatably supported for rotation about a central axis of the roller tube, the roller tubes arranged in side-by-side fashion for support of hot dogs between adjacent pairs of the roller tubes; and a drive system adapted for actuation by a drive motor, the drive system including a gear assembly having a plurality of drive gears and a plurality of intermediate gears, the drive and intermediate gears being rotatably supported for rotation about central axes of the gears, each of the intermediate gears being disposed between a pair of the drive gears and arranged such that all of the drive gears of the gear assembly rotate in the same rotational direction during actuation of the drive system, each of the drive gears being adapted for engagement by the drive motor such that the drive system can be actuated using any of the drive gears, wherein each of the drive gears defines a socket opening adapted for receiving a chuck of the drive motor.

* * * * *